United States Patent
Archer et al.

(10) Patent No.: US 7,826,379 B2
(45) Date of Patent: Nov. 2, 2010

(54) ALL-TO-ALL SEQUENCED FAULT DETECTION SYSTEM

(75) Inventors: Charles Jens Archer, Rochester, MN (US); Kurt Walter Pinnow, Rochester, MN (US); Joseph D. Ratterman, Rochester, MN (US); Brian Edward Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1152 days.

(21) Appl. No.: 11/052,658

(22) Filed: Feb. 7, 2005

(65) Prior Publication Data

US 2006/0176826 A1    Aug. 10, 2006

(51) Int. Cl.
G01R 31/08 (2006.01)
G06F 11/00 (2006.01)
G06F 15/173 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. .......................... 370/242; 714/4; 709/223
(58) Field of Classification Search ................ 370/216, 370/241, 242; 714/4, 43, 44, 10–13; 712/31; 709/223
See application file for complete search history.

(56) References Cited

U.S. PATENT DOCUMENTS

| | | | | |
|---|---|---|---|---|
| 4,320,508 A * | 3/1982 | Takezoe | ........................ | 714/4 |
| 4,376,973 A * | 3/1983 | Chivers | ........................ | 712/229 |
| 5,325,518 A * | 6/1994 | Bianchini, Jr. | ................ | 714/31 |
| 5,537,653 A * | 7/1996 | Bianchini, Jr. | ................ | 714/25 |
| 5,561,769 A * | 10/1996 | Kumar et al. | ................ | 709/202 |
| 5,590,284 A * | 12/1996 | Crosetto | ........................ | 712/29 |
| 5,684,807 A * | 11/1997 | Bianchini et al. | ............ | 714/712 |
| 5,835,697 A * | 11/1998 | Watabe et al. | .................. | 714/11 |
| 5,920,267 A * | 7/1999 | Tattersall et al. | ............. | 370/258 |
| 6,073,249 A * | 6/2000 | Watabe et al. | ................... | 714/4 |
| 6,108,796 A * | 8/2000 | Lasken | .......................... | 714/4 |
| 6,233,702 B1 * | 5/2001 | Horst et al. | ..................... | 714/48 |
| 6,714,552 B1 * | 3/2004 | Cotter | ......................... | 370/406 |
| 6,880,100 B2 * | 4/2005 | Mora et al. | ...................... | 714/4 |
| 7,046,621 B2 * | 5/2006 | Wang et al. | .................... | 370/222 |
| 7,058,008 B1 * | 6/2006 | Wilson et al. | ................ | 370/216 |
| 7,085,959 B2 * | 8/2006 | Safford | .......................... | 714/11 |
| 7,139,925 B2 * | 11/2006 | Dinker et al. | ................... | 714/4 |
| 2002/0178306 A1 * | 11/2002 | Shimizu | ........................ | 710/56 |
| 2003/0198251 A1 * | 10/2003 | Black et al. | .................. | 370/462 |
| 2004/0008719 A1 * | 1/2004 | Ying | ........................... | 370/460 |
| 2005/0198097 A1 * | 9/2005 | Kalnitsky | .................... | 709/200 |
| 2005/0246569 A1 * | 11/2005 | Ballew et al. | .................. | 714/4 |

* cited by examiner

Primary Examiner—Ayaz R Sheikh
Assistant Examiner—Hoang-Chuong Q Vu
(74) Attorney, Agent, or Firm—Wood, Herron & Evans, LLP

(57) ABSTRACT

An apparatus, program product and method enable nodal fault detection by sequencing communications between all system nodes. A master node may coordinate communications between two slave nodes before sequencing to and initiating communications between a new pair of slave nodes. The communications may be analyzed to determine the nodal fault.

8 Claims, 3 Drawing Sheets

ALL-TO-ALL SEQUENCED FAULT DETECTION SYSTEM

This invention was made with Government support under Contract No. B519700 awarded by the Department of Energy. The Government has certain rights in this invention.

CROSS-REFERENCE TO RELATED APPLICATIONS

This application is related to the following U.S. patent applications all filed on even date herewith by Charles Jens Archer et al.: Ser. No. 11/052,659, entitled "CELL BOUNDARY FAULT DETECTION SYSTEM," Ser. No. 11/052,660, entitled "ROW FAULT DETECTION SYSTEM," Ser. No. 11/052,661, entitled "MULTI-DIRECTIONAL FAULT DETECTION SYSTEM," Ser. No. 11/052,663[11], entitled "BISECTIONAL FAULT DETECTION SYSTEM," and Ser. No. 11/052,662, entitled "ALL ROW, PLANAR FAULT DETECTION SYSTEM," The present application is also related to U.S. patent application filed on even date herewith by John A. Gunnels et al., Ser. No. 11/050,945, entitled "SYSTEM AND METHOD FOR DETECTING A FAULTY OBJECT IN A SYSTEM,". Each of these applications is incorporated by reference herein.

FIELD OF THE INVENTION

The invention is generally directed to parallel processing computer systems, and in particular, to fault detection in parallel processing computer systems.

BACKGROUND OF THE INVENTION

Parallel processing computer systems have found application in a number of different computing scenarios, particularly those requiring high performance and fault tolerance. For instance, airlines rely on parallel processing to process customer information, forecast demand and decide what fares to charge. The medical community uses parallel processing supercomputers to analyze magnetic resonance images and to study models of bone implant systems. A parallel processing architecture generally allows several processors having their own memory to work simultaneously. Parallel computing systems thus enable networked processing resources, or nodes, to cooperatively perform computer tasks.

The best candidates for parallel processing typically include projects that require many different computations. Unlike single processor computers that perform computations sequentially, parallel processing systems can perform several computations at once, drastically reducing the time it takes to complete a project. Overall performance is increased because multiple nodes can handle a larger number of tasks in parallel than could a single computer.

Other advantageous features of some parallel processing systems regard their scalable, or modular nature. This modular characteristic allows system designers to add or subtract nodes from a system according to specific operating requirements of a user. Parallel processing systems may further utilize load balancing to fairly distribute work among nodes, preventing individual nodes from becoming overloaded, and maximizing overall system performance. In this manner, a task that might otherwise take several days on a single processing machine can be completed in minutes.

In addition to providing superior processing capabilities, parallel processing computers allow an improved level of redundancy, or fault tolerance. Should any one node in a parallel processing system fail, the operations previously performed by that node may be handled by other nodes in the system. Tasks may thus be accomplished irrespective of particular node failures that could otherwise cause a failure in non-parallel processing environments.

Despite the improved fault tolerance afforded by parallel computing systems, however, faulty nodes can hinder performance in the aggregate. It consequently becomes necessary to eventually replace or otherwise fix underperforming nodes and/or associated connections. For instance, it may be advantageous to check for faulty cables, software, processors, memory and interconnections as modular computing components are added to a parallel computing system.

The relatively large number of nodes used in some such systems, however, can complicate node maintenance. Ironically, the very redundancy that enables fault tolerance can sometimes challenge processes used to find faulty nodes. With so many nodes and alternative data paths, it may be difficult to pinpoint the address, or even the general region of a node, or nodal connection requiring service.

As such, a significant need exists for a more effective way of determining and locating faulty nodes in a parallel processing environment.

SUMMARY OF THE INVENTION

The invention addresses these and other problems associated with the prior art by providing an improved apparatus, program product, and method of determining a nodal fault in a parallel processing environment. Aspects of the invention may sequence communications between all nodes in a group or entire system. A master node may coordinate communications between two slave nodes before sequencing to and initiating communications between a new pair of slave nodes. The sequence may continue until all nodes have communicated. The "all-to-all" node communications may be analyzed to determine the nodal fault.

One aspect of the invention causes each of a plurality of nodes to sequentially communicate with each other. For instance, a first node pair may communicate data packets, while a second node pair waits on the completion of the first pair's communication. One or more of the communications between the nodes may then be used to determine the nodal fault. Causes of such a fault may relate to a software, a cable connection or some other hardware component.

The information pertaining to the nodal fault may be logged and/or used to initiate servicing of the fault. The communications may further be evaluated in terms of latency and bandwidth conformance.

Where advantageous, a master node coordinates communications between respective slave nodes, i.e., the master node coordinates the sequencing of the communications. To this end, the master node may send a control packet to one or more slave nodes, prompting their communication. The slave nodes may generate a status signal indicative of the communication, e.g., successful communication or nodal fault indicator.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
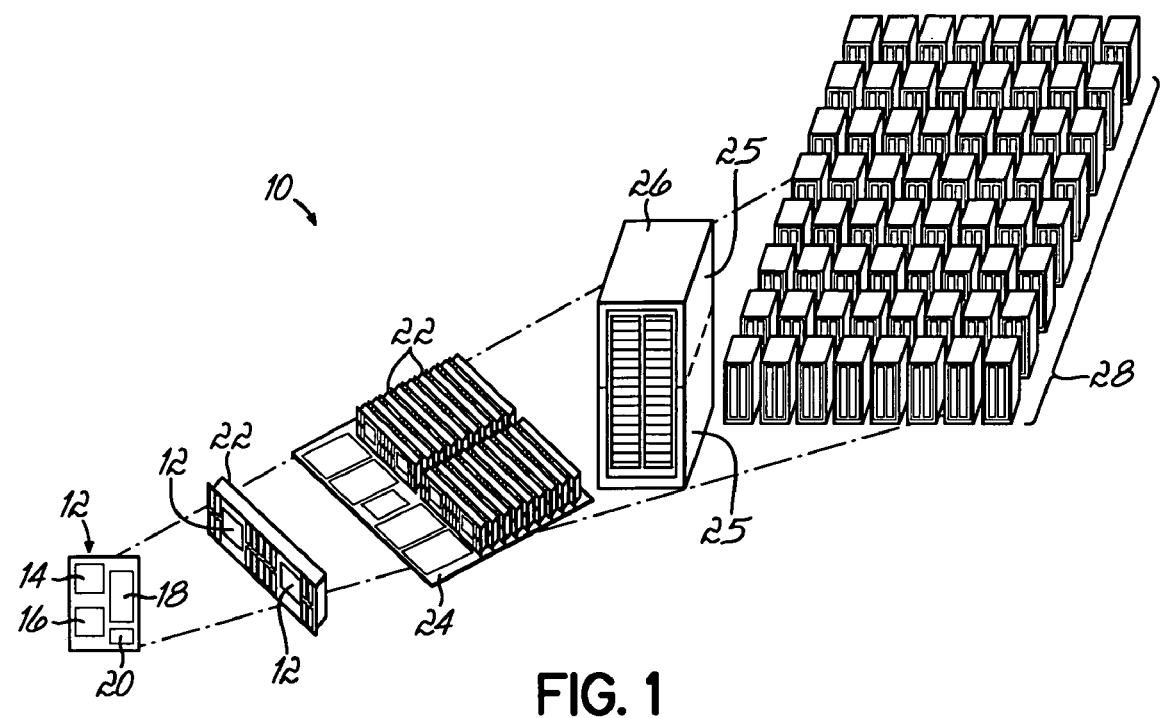
FIG. 1 is a block diagram that includes components of a parallel processing system configured to detect nodal faults using a scalable algorithm that sequentially sends packets from all nodes to all other nodes.

Parallel computing systems, such as the BlueGene/L system created by International Business Machines, often include a node cellular architecture. As discuss below in detail, the BlueGene/L system is built from blocks of node midplanes that may be connected through several inter and intra midplane networks. The system may be constructed incrementally, with midplane cells being added to build the larger, final system. As each midplane is added to the system, the hardware and system software must be tested for faulty configurations, including interconnect, processing, memory and software control.

The primary point to point message passing network for BlueGene/L is a three dimensional torus network, where every node is connected to six other nodes in a mesh, forming a cube of (x,y,z) nodes. For example, a 512 node midplane torus consists of an 8×8×8 node arrangement. Torus implies that the nodes on the face of the cube wrap around to connect to nodes on the opposite face. This torus network can be extended in all three directions by connecting the faces of these logical cubes via link chips, which are essentially switches between midplanes. The link chips are connected via cables, while the internal torus is connected via circuitry within the midplane.

The torus network and cellular characteristic of the system permit dynamic rerouting around problematic nodes and links, or nodal faults. However, increased communication costs are incurred each time a rerouted communication must travel through a different level of organization, e.g., node, midplane, etc. For instance, it may take more time for a data packet to be routed over to an adjacent cell than would it to another node in the same cell. This may be because the data packet would have to travel over additional cabling that connects to respective faces of adjacent cells, requiring relatively more travel and processing time. It is consequently desirable to promptly detect and service nodal faults in order to minimize associated boundary changes and rerouting. Unfortunately, the very redundancy designed into the system complicates conventional processes used to find nodal faults. With so many nodes and alternative data paths, pinpointing the location of a node or nodal connection requiring service may be problematic.

To address this need, the present invention capitalizes on features of the system to detect faulty torus links, miscabled midplanes, and bad hardware in general. For instance, compute Application Specific Integrated Circuits (ASIC's) of the BlueGene/L include error detection registers. An error detection register may, for instance, register the number of torus retransmits for each direction. Aspects of the invention may use this data to help pinpoint hardware failures after tests are run. The BlueGene/L compute ASIC will also deliver interrupts to the operating system if the hardware is put into an exceptional state. These two features thus provide a basis for internal (via software) and external (via the control system or system monitoring facilities) fault detection capability.

The processes of the present invention may include first booting the system via a control system. The program code loads may take place using a control network that is completely independent of the torus. Once the program code is loaded on the system and the hardware is initialized, the tests consistent with the invention may be run. After the tests complete, data collection may be performed either via the external hardware interfaces, or through the software interfaces.

Aspects of the invention detect nodal faults by causing all nodes in system to communicate with each other. This all-to-all communication thus may entail sending packets from all nodes to all other nodes. This feature ensures that each link will carry some network load. The package communications may be sequenced. For instance, the communications may proceed in lock-step fashion, or take turns. This coordinated sequencing helps prevent network link saturation that could otherwise occur if all nodes communicated simultaneously. That is, a system could otherwise become overwhelmed by too much data if all nodes attempted to communicate simultaneously with all other nodes of a group or system.

The system may use a master-slave approach in which one node is designated a master, and all other nodes in a cell or other grouping are designated slaves. The master node controls all other nodes in a group, and more particularly, may expressly coordinate communication between slave nodes. For instance, the master node may send a packet of information to first and second slave nodes. The first and second nodes will then communicate signals through a network. Bandwidth and latency statistics relating to the communication may be generated for analysis. After the communication has finished, both nodes may send their results to the master node. The master node may then send a control packet to the first node and a third node, and so on, sequencing through all nodes in the cell.

In an example where there are four nodes in a system, the master node may send a communication to a first node, then a second, then a third. The first node, in turn, may send a communication to the master node, the second node, and the third node. The second node may communicate with the master node, the first node and the third node. The third node may communicate with the master, then the first, then the second nodes.

In this manner, the system may complete each point-to-point communication. If a communication does not complete, then there has been an error. In addition, performance of the system may be assessed in terms of latency and maximum bandwidth. If either of these criteria fail, hardware registers may be checked for retransmission errors, which are indicative of a hardware failure. If the operating system is put into an exception state, then the system may be checked for a misconfigured network. As discussed herein, the number of cells checked in the above manner may vary per application specifications. For instance, modules, or cells of a network may be checked in parallel by using multiple master nodes, i.e., one master node for each node grouping.

Turning to the Drawings, wherein like numbers may denote like parts throughout several views, FIG. 1 shows components 12, 22, 24, 26 of a parallel processing system 28 configured to detect nodal faults using a scalable algorithm that may send packets from all nodes to all other nodes 12, i.e., all to all. FIG. 1 more particularly shows a parallel computing system 28, or apparatus, such as the BlueGene/L system created by International Business Machines. The system 28 comprises a highly scalable, cellular architecture that can be replicated in a regular pattern, with no introduction of bottlenecks as the system is scaled up.

The parallel processing system 28 fundamentally includes a plurality of nodes 12. Each node 12 typically comprises two Application Specific Integrated Circuits (ASIC's) 14, 16, a local cache memory 18 and an Input/Output (I/O) interface 20. ASIC's 14, 16 share external memory 29 located on a card 22, onto which two nodes 12 mount. Sixteen cards 22 are typically placed on a node board 24. Sixteen node boards 24 comprise a midplane, or cell 25, two of which may be positioned inside a cabinet 26 for a total of 1024 nodes, or 512 nodes per cell. The system 28 includes sixty-four cabinets and over sixty-five thousand nodes.

The nodes 12 may be interconnected through multiple, complementary highspeed and low latency networks. The networks typically include a three-dimensional torus network that wraps around the edges, and a combining tree network for fast global operations. The torus network includes point-to-point, serial links between routers embedded within the system ASIC's. As such, each node has six nearest-neighbor connections, some of which may traverse relatively long cables.

Though not shown, the system 28 may include a front end, host computer used for compiling, diagnostics and/or analysis. An I/O node of the system 28 may handle communications between a compute node and other systems, including the host and file servers. The choice of host may depend on the class of applications, as well as their bandwidth and performance requirements.

Figure 2:
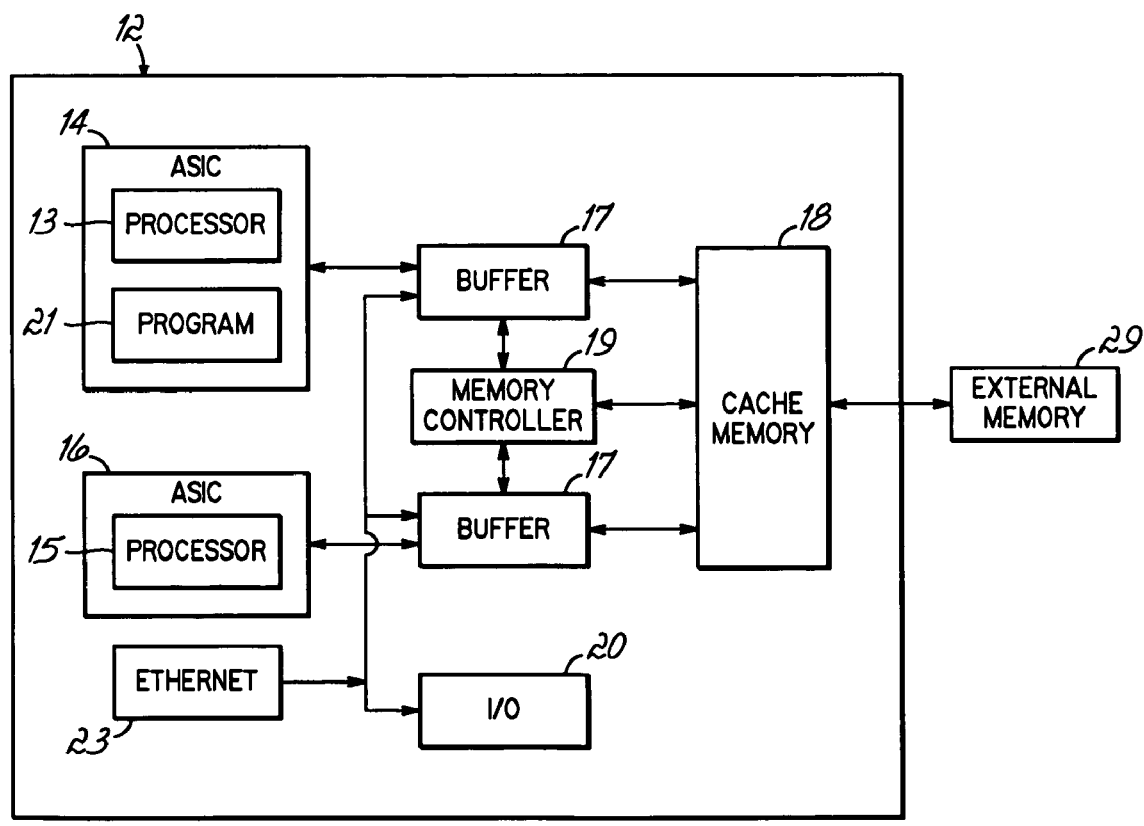
FIG. 2 is a block diagram of a node of the parallel processing system of FIG. 1.

FIG. 2 is a block diagram of a node 12 of the parallel processing system 28 of FIG. 1. The BlueGene/L node 12 includes a compute ASIC 14 comprising necessary network interfaces and on-chip memory. An on-chip memory controller 19 provides access to a cache memory 18, such as Synchronous Dynamic Random Access Memory (SDRAM) memory chips.

In addition to the compute ASIC 14, each node 12 may include a link ASIC 16 for messaging. When crossing a cell boundary, network interrupt signals pass through the link ASIC 16. This link ASIC 16 re-drives signals over cables between cells and redirects signals between its different ports. These design features allow improved signal quality and less traffic interference. These features also enable additional cells to be cabled as spares to the system and used, as needed, upon failures. Each of the partitions formed through this manner has its own torus, tree and barrier networks that are isolated from all traffic from all other partitions.

Processors 13, 15 of the respective ASIC's 14, 16 thus communicate with the cache memory 18, memory controller 19 and associated buffers 17. Furthermore, one or more of the processors 13, 15 may couple to a number of external devices, including an input/output interface 20, memory 29, a workstation controller (not shown) and an Ethernet interface 23.

One skilled in the art will appreciate that any number of alternate computer architectures may be used in the alternative. That is, while the node 12 of FIG. 2 comprises a specific hardware implementation having particular application within the context of an embodiment consistent with the invention, it is not intended to limit the scope of the invention. It should consequently be appreciated that the invention may be implemented in other computers and data processing systems, e.g., in single or multi-user computers such as workstations, desktop computers, portable computers, server computers and the like, or in other programmable electronic devices (e.g., incorporating embedded controllers and the like). That is, the number of card, processors, slots, etc., and network configurations may change according to application specifications.

The discussion hereinafter will focus on the specific routines utilized to implement the above-described system 28. The routines executed to implement the embodiments of the invention, whether implemented as part of an operating system or a specific application, component, program, object, module or sequence of instructions executed by node or other processors, will also be referred to herein as "computer program code," or simply "program code." The computer program code typically comprises one or more instructions that are resident at various times in various memory and storage devices in a computer, and that, when read and executed by one or more nodal or other processors of a computer system, cause that system to perform the steps necessary to execute steps or elements embodying the various aspects of the invention. For instance, program 21 may enable synchronized, all-to-all nodal fault detection. "Nodal" for purpose of this specification may refer to the hardware or software relating to a node, including a connection associated with a node.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 3:
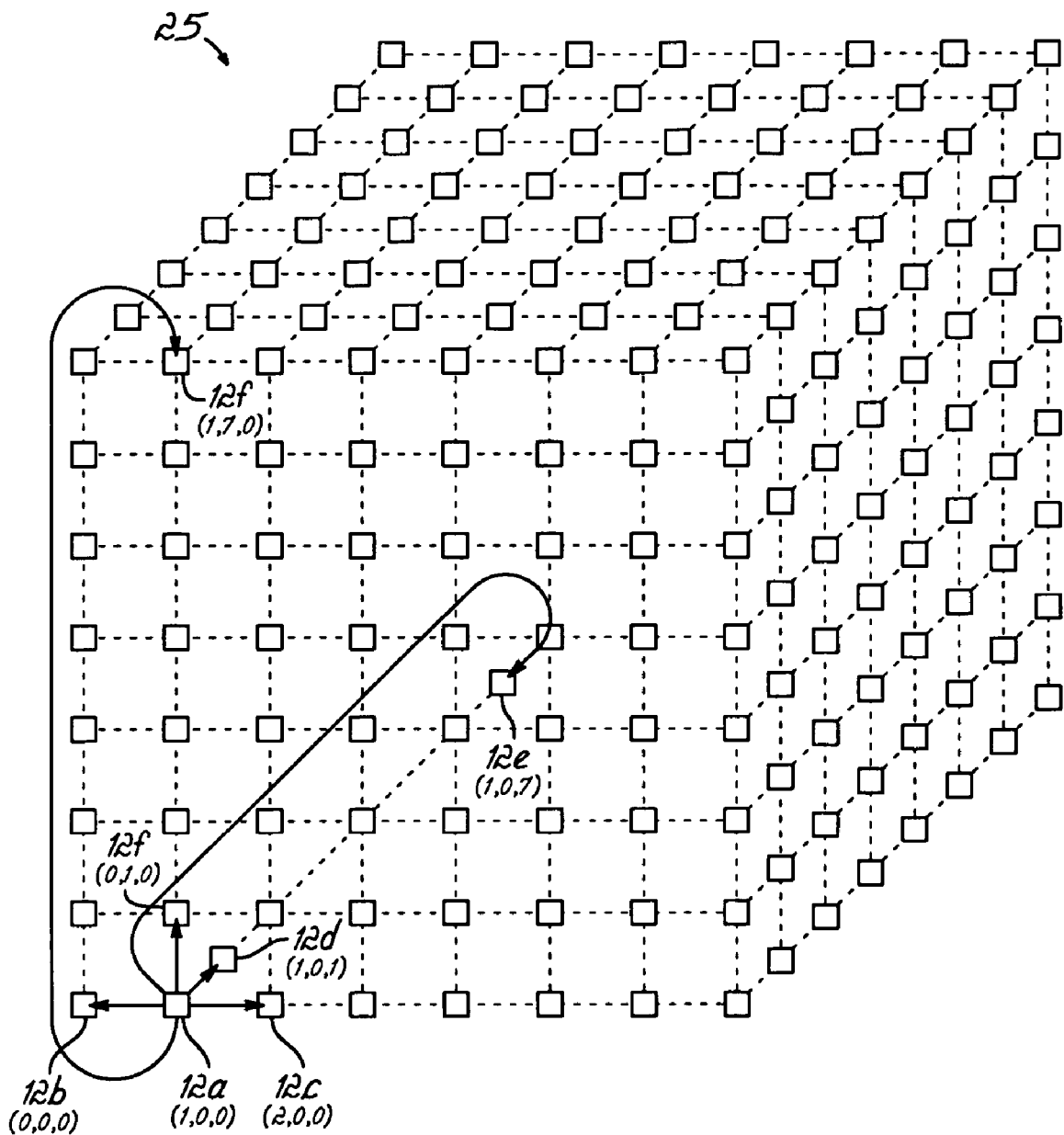
FIG. 3 is a block diagram of a midplane of the parallel processing system of FIG. 1.

FIG. 3 is a block diagram of a midplane, or cell 25, of the parallel processing system 28 of FIG. 1. The cell 25 includes an eight-by-eight-by-eight structure of 512 interconnected computing nodes. In the context of the present invention, the cell 25 includes a master node 12a. The master node 12a has coordinates (1,0,0) and is configured to coordinate and synchronize all-to-all testing for all of the nodes of the cell 25. For instance, the master node 12a, which may be internally designated "node 0," may send a packet to both slave nodes 12b and 12c. Nodes 12b and 12c may be designated nodes 1 and 2, respectively, and comprise coordinate sets (0,0,0) and (2,0,0). Nodes 12b and 12c may then communicate with each other through the torus network of the cell 25. After the communication is complete, the nodes 12b and 12c may send the results of their results to the master node 12a.

The master node 12a may then send a packet to a next pair of slave nodes, 12d and 12e. Nodes 12d and 12e may similarly communicate with each other, and then with the master node 12a. A next sequence of the synchronized all-to-all testing may involve the pair, 12f and 12g. Still a next pair may include 12b and 12d, then 12b and 12e, and so on until all nodes of the cell 25 and/or system 28 have been tested.

Those skilled in the art will recognize that the exemplary environments illustrated in FIGS. 1-3 are not intended to limit the present invention. While the nodes 12 of FIGS. 1-3 are shown connected in a modular fashion, any combination of local area networks (LAN's), wide area networks (WAN's) and/or other networking topologies known in the art may alternatively be used to network computing processors comprising nodes. Individual nodes may thus not be physically located in close proximity with other nodes, i.e., be geographically separated from other nodes as is well known in the art. Moreover, a wide variety of interconnection types, network types, member types, etc., may be permitted to coexist with one another in an efficient and reliable manner in parallel computing system. Indeed, those skilled in the art will recognize that other alternative hardware and/or software environments may be used without departing from the scope of the invention.

Figure 4:
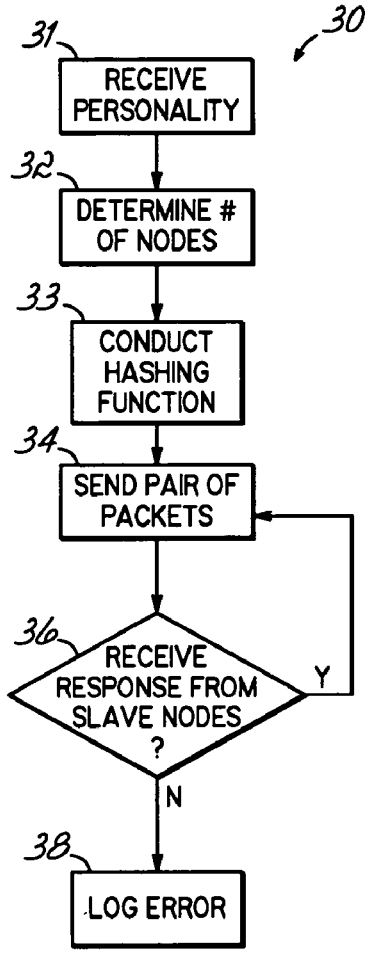
FIG. 4 is a flowchart having a set of exemplary steps executable by the system of FIG. 1 for conducting an all-to-all, synchronized nodal fault test from the perspective of a master node.

FIG. 4 is a flowchart 30 having a set of exemplary steps executable by the system 28 of FIG. 1 for conducting an all-to-all, synchronized nodal fault test. More particularly, the flowchart 30 shows steps taken by the master node 12a during a testing process. At block 31 of FIG. 4, the master node 12a may receive a personality communication. The personality communication may comprise a message sent from the control system to each node during startup. The personality communication further includes information used by the ASIC's 14, 16 of each node. Such information may include the coordinates of the receiving node, as well as the size of cell 25 and/or system 28.

As such, the master node 12a may determine the number of nodes in the cell 25 at block 32 of FIG. 4. For instance, the master node 12a may determine from the personality communication at block 32 that the cell has 512 nodes. The master node 12a may then proceed at block 33 to conduct a hashing function configured determine pairs and/or a sequence useful for performing all-to-all, sequenced nodal communications.

The master node 12a may initiate the all-to-all fault detection processes at block 34 by generating and sending a control packet to each of two slave nodes 12b, 12c. The packets may include information read by the ASIC's of the slave nodes 12b, 12c and include the coordinate address of a partner slave node. These slave nodes 12b, 12c may attempt to communicate with each other prior to sending respective responses received by the master node 12a at block 36.

The response may comprise success signals indicating that the nodal connections associated with the paired slave nodes 12b, 12c are functioning satisfactorily. In the absence of such success status responses at block 38, the system 28 may log an error at block 38 indicating the likelihood of a faulty nodal connection associated with at least one of the slave nodes 12b, 12c. In any case, the master node 12a may subsequently send packets to a next pair of slave nodes 12b, 12d. In this manner, the master node 12a may sequence through point-to-point connections of all nodes in a network. Without such coordinated sequencing of communications, the simultaneous communications between large numbers of nodes could produce unusable results.

Figure 5:
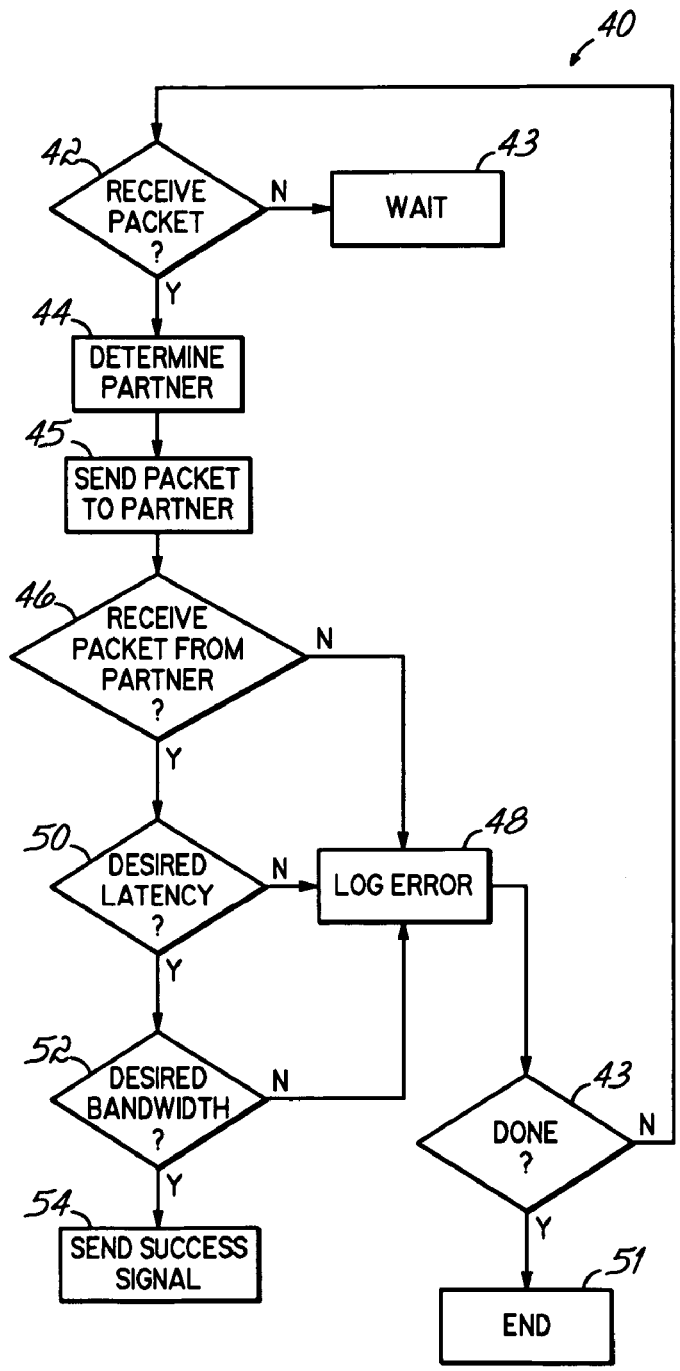
FIG. 5 is a flowchart having a set of exemplary steps executable by the system of FIG. 1 for conducting an all-to-all, synchronized nodal fault test from the perspective of a slave node.

FIG. 5 is a flowchart 40 having a set of exemplary steps executable by the system of FIG. 1 for conducting an all-to-all, synchronized nodal fault test from the perspective of a slave node 12b. More particularly, the actions of the slave node 12b may be concurrent and/or interactive those actions of the master node processes of FIG. 4. The processes of the flowchart 40 may presume the receipt of the personality communication. As such, the slave node 12b may be assigned coordinates relative to the other nodes of a cell 25.

Turning more particularly to block 43 of FIG. 5, the slave node 12b may wait until it receives at block 42 a control packet from the master node 12a. The slave node 12b may determine at block 44 a partner, or paired slave node 12b, from the control packet. The slave node 12b may then send at block 45 a packet to the determined partner slave node 12c. The slave node 12b may concurrently receive a packet node at block 46 from the paired slave node 12c.

Where alternatively no communication from the partner slave node 12c is received at block 46, an error may be logged at block 48. The absence of a return communication from the partner slave node 12c may indicate a faulty connection between the paired nodes 12b, 12c. An error may also be logged at block 48 if the performance of the communication from the partner node 12c to the slave node 12b fails to conform to a desired latency at block 50. Latency generally regards the time it takes the packet to arrive at its destination. Similarly, an error may be logged if the performance of the communication fails to conform at block 52 with a desired bandwidth, or rate of data transmission.

If more links and nodes need to be tested at block 49, then the sequence may continue at block 42. The test may otherwise conclude at block 51. If the performance conditions are alternatively met at blocks 50 and 52, then the slave node 12b may send a success signal to the master node 12a at block 54.

While the present invention has been illustrated by a description of various embodiments and while these embodiments have been described in considerable detail, it is not the intention of the applicants to restrict, or in any way limit, the scope of the appended claims to such detail. For instance, any of the steps of the above exemplary flowcharts may be deleted, augmented, made to be simultaneous with another or be otherwise altered in accordance with the principles of the present invention. Additional advantages and modifications will readily appear to those skilled in the art.

One skilled in the art will further appreciate that while the processes of the present invention may provide particular advantages within the context of parallel processing systems, the principles of the invention further may apply to many other applications, to include most nodal fault detection operations. Furthermore, while cells discussed herein are described generally in the context of midplanes, one skilled in the art will appreciate that a midplane is just one type of cell in accordance with the principles of the present invention.

Moreover, while a cell comprises a grouping of nodes as discussed herein, a cell more particularly includes a grouping of nodes that communicates more quickly with each other than with other nodes. For instance, intra-cell communications generally require less cabling and associated routing processes. Furthermore, while the midplane cell of FIG. 3 shows a cubical structure, one skilled in the art will appreciate that cells may take on additional symmetric and asymmetric shapes, including those having more or less than six faces. Relatedly, while the torus network is a three dimensional network, networks and associated hardware/software may implicate fewer or more dimensions. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for determining a nodal fault in a parallel processing computing system having a plurality of interconnected nodes, the method comprising:
   determining a master node of the plurality of interconnected nodes;
   causing each of the plurality of interconnected nodes to sequentially communicate with all other of the interconnected nodes in a lockstep fashion, wherein the master node is configured to coordinate the sequential communication; and
   determining from the sequential communications the nodal fault relating to at least one of the plurality of interconnected nodes,
   wherein sequentially communicating includes:
      sending a first control packet from the master node to a first of two slave nodes of the plurality of nodes, wherein the first control packet prompts the first slave node to communicate with a second of the two slave nodes of the plurality of nodes; and
      sending a second control packet from the master node to the second slave node, wherein the second control packet prompts the second slave node to communicate with the first slave node.

2. The method of claim 1, further comprising servicing the nodal fault.

3. The method of claim 1, wherein determining the nodal fault includes determining a fault associated with at least one of software, a connection, and another hardware component.

4. The method of claim 1, wherein causing the plurality of nodes to sequentially communicate in a lockstep fashion includes causing the first slave node of the plurality of interconnected nodes to wait while the second slave node communicates.

5. The method of claim 1, wherein determining the nodal fault includes determining a latency associated with a nodal communication.

6. The method of claim 1, wherein determining the nodal fault includes determining a bandwidth associated with a nodal connection.

7. The method of claim 1, further comprising storing an indication of the nodal fault.

8. The method of claim 1, further comprising generating a status signal indicative of the communication between the two slave nodes.

* * * * *